United States Patent
Lorenz et al.

[11] 3,899,471
[45] Aug. 12, 1975

[54] DIALKYLAMINOETHYL VINYL ETHER INTERPOLYMERS

[75] Inventors: Donald H. Lorenz, Basking Ridge, N.J.; Earl P. Williams, Pen Argyl, Pa.

[73] Assignee: GAF Corporation, New York, N.Y.

[22] Filed: Oct. 21, 1971

[21] Appl. No.: 191,538

[52] U.S. Cl. .............. 260/80.73; 162/168; 210/54; 260/29.6 H; 260/29.6 TA; 260/65; 260/80.3 N; 260/80.72
[51] Int. Cl..................... C08f 15/02; C08f 15/00
[58] Field of Search......... 260/80.3 N, 80.72, 80.73, 260/65

[56] References Cited
UNITED STATES PATENTS

| | | | |
|---|---|---|---|
| 2,871,203 | 1/1959 | Melamed | 260/2.1 |
| 2,897,200 | 7/1959 | Maeder et al. | 260/247.2 |
| 2,980,634 | 4/1961 | Melamed | 260/2.1 |
| 3,509,113 | 4/1970 | Monagle et al. | 260/79.3 |

*Primary Examiner*—Stanford M. Levin
*Attorney, Agent, or Firm*—Walter C. Kehm

[57] ABSTRACT

Water soluble dialkylaminoethyl vinyl ether interpolymers of the formula

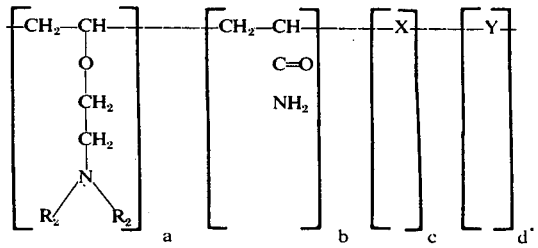

and salts thereof wherein $R_1$ and $R_2$ are each selected from the group consisting of methyl, ethyl, or hydroxyethyl or taken together with the N atom to which they are attached a heterocyclic ring, X and Y are selected from vinyl monomers copolymerizable with said other monomers and wherein the proportions of a, b, c and d of said monomer units in said interpolymer calculated on the basis of weight percent of the interpolymer amount to 80–10 weight percent of a, 70–10 weight percent of b, 30–0 weight percent of c, and 20–0 weight percent of d.

The interpolymers of the invention are useful as flocculants and retention aids.

12 Claims, No Drawings

DIALKYLAMINOETHYL VINYL ETHER INTERPOLYMERS

This invention relates to novel dialkylaminoethyl vinyl ether interpolymers and their water soluble derivatives, and to methods of making and using the same. More particularly, this invention relates to dialkylaminoethyl vinyl ether interpolymers and their water soluble derivatives such as their salts, quaternary compound and the like which are useful as flocculants and retention aids.

The novel interpolymers of the invention can be represented by the following structural formula.

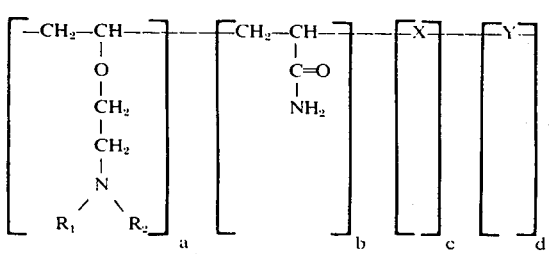

wherein $R_1$, $R_2$ are the same or different and represent methyl, ethyl, hydroxyethyl, or taken together with the nitrogen atom to which they are attached, a heterocyclic radical as exemplified by piperidyl, pyrrolidyl, morpholinyl and piperazinyl, X and Y are each a vinyl monomer copolymerizable with said other monomers present, as exemplified by lower alkyl acrylate, vinyl pyrrolidone, hydroxyethyl acrylate, hydropropyl acrylate, vinyl acetate, acrylonitrile; diacetone acrylamide, hydroxymethylacetone acrylamide, and methacrylamide, and wherein the proportions of $a$, $b$, $c$ and $d$ referred to said monomer units in said interpolymer calculated on the basis of weight percent on the interpolymer amount to 80–10 weight percent of $a$, 70–10 weight percent of $b$, 30–0 weight percent of $c$ and 20–0 weight percent of $d$.

As to the salts of the interpolymers, it has been found that by adjustment of the cationic character of the basic interpolymer, i.e., by adjustment of the base to form the salt by reaction with acid such as acetic acid, hydrochloric acid, hydrobromic acid, sulfuric acid, phosphoric acid and the like, the properties of the interpolymer can be optimized. The same is true of a quaternary polymer, that is reacting the interpolymer with a quaternizing agent such as methyl chloride, ethyl chloride, dimethyl sulfate, diethyl sulfate and the like, converting the basic polymer to the quaternary polymer improves its activity, for instance, as a flocculant.

The interpolymers and their derivatives in accordance with the invention are useful as flocculants for aqueous dispersions of inorganic or organic particles and as filler retention aids. Thus, it has now been found that interpolymers of dimethylaminoethyl vinyl ether in accordance with the invention have good activity for raw sewage flocculation, sewage sludge de-watering, and filler retention for paper making, both in rosin-sized and neutral-sized paper. The novel interpolymers of the invention have the added advantage of high activity at relatively low viscosity and are associated further with very little odor. In addition, it has been found that by simple adjustment of the cationic character, that is adjustment of the base form to the corresponding salt by reaction of the base with acid, the properties of the interpolymer can be maximized for various applications. Thus, for example, the free base form of the interpolymer evidences good activity for rosin-sized pigment retention in paper but only marginally good activity in neutral-sized pigment retention in paper. By converting the basic polymer with acetic acid to a pH of 6.0, the equivalence point for conversion to the salt, there results a product of exceptional high activity for neutral-sized pigment retention, but of lesser activity in rosin-sized pigment retention.

The interpolymer of the invention can be prepared by interpolymerizing a mixture of monomers in aqueous medium at solids contents ranging from 10–50 percent by weight. The monomers are used in a ratio to produce an interpolymer of monomer content within the ranges as set forth above. The polymerization is carried out in the presence of a catalytic amount and preferably 0.05% to 5.0% of an organic free radical generating initiator. The free radical generating initiator or catalyst which is selected is very important with respect to the molecular weight of the resultant interpolymer. For example, the use of azobisisobutyronitrile as a free radical catalyst results in the formation of an interpolymer having a molecular weight which is too low for use thereof as an effective flocculant. The molecular weight is not, however, completely dependent on the catalyst concentration, so that by lowering the catalyst concentration lower conversions are obtained rather than higher molecular weight products being produced. Potassium persulfate has been found to be an effective catalyst but only when the same is used at temperatures lower than those at which it is normally used. The use of potassium persulfate at polymerization temperatures ranging from 0° to 50°C allows for the preparation of interpolymers having high enough molecular weight so that the same constitutes effective flocculants. If higher temperatures are used, the molecular weight is lowered and further the reaction does not go to completion. Another catalyst, tetrapotassium peroxydiphosphate may be employed, but the temperature necessary in order to produce the required molecular weight must be raised to 50°–80°C. Combinations of persulfate and tetrapotassium peroxydiphosphate can also be advantageously used as free radical catalysts.

The pH of the aqueous polymerization medium is also important with respect to obtaining polymers of suitable molecular weight so that they can be used as flocculants. In accordance with the invention, it has been found that the pH is required to the above 7.0 in order for the catalyst to be operable in the polymerization. It is believed that the reason for this is that the tertiary amino alkyl vinyl ether takes part in inducing the catalyst to liberate free radicals which in the presence of a second vinyl monomer having a structure

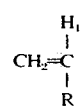

for example,

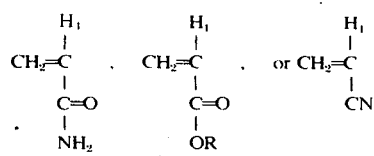

and the like starts the polymerization and allows long kinetic chains to be formed. Additional catalyst is added increment-wise during the polymerization in order to maintain a rapid rate of polymerization and to produce the desired molecular weight and degree of conversion.

Monomers where $H_1$ is replaced by methyl do not polymerize in this system to provide polymers having a molecular weight high enough for them to be suitable for use as flocculants.

Thus it can be appreciated that the conditions of polymerization for producing a polymer suitable for use as a flocculating agent are quite narrow.

One of the disadvantages of many of the known polymeric flocculants is that in order to be effective, they must have very high molecular weights. This has the result that watery solutions containing the same are very viscous and difficult to handle unless the solids contents are lowered to 5–15%, which brings about an increase in the cost of shipping thereof and requires considerably larger storage facilities. Most polyacrylamide polymers fall into this high molecular weight category. By increasing the cationic character of the polymers, by copolymerization or reaction, effective flocculants can be produced characterized by lower molecular weight. The polymers of dimethylaminoethyl vinyl ether, particularly those with acrylamide, have been found to be particularly effective at lower molecular weights. In addition, it has been found that while the basic polymer has a satisfactory activity, conversion to the corresponding salt with acid improves the polymer's activity as a flocculant and also results in an improvement in its properties. Reaction with methyl chloride serves to convert the basic polymer into the corresponding quaternary polymer which also results in an improved product for use as a flocculant.

This invention will appear more fully from the examples which follow. These examples are set forth by way of illustration only and are in no way to be construed as limitative of the scope of the invention.

EXAMPLE 1

The following charge was prepared and divided up into samples of equal quantity, which samples were then introduced into individual pyrex polymerization tubes and, after removal of air, subjected to polymerization as set out in the table for establishing the effect of the catalyst and temperatures of the polymerization:
10 g. acrylamide,
10 g. dimethylaminoethyl vinyl ether,
60 g. distilled water, and
0.2% tabulated on the weight of the monomer content of the catalyst as set out in the table.

| Exp. | Catalyst | Temp. | Brookfield Visc.-of Final Product | Flocculant Test |
|---|---|---|---|---|
| 1 | Azobisisobutyronitrile | 27°C | 10 cps. | No activity |
| 2 | Azobisisobutyronitrile | 60°C | 200 cps. | Very much inferior |

-Continued

| Exp. | Catalyst | Temp. | Brookfield Visc.-of Final Product | Flocculant Test |
|---|---|---|---|---|
| 3 | $K_2S_2O_8$ | 27°C | 34,800 cps. | Equal |
| 4 | $K_2S_2O_8$ | 60°C | 5,350 cps. | Inferior |

The results of these tests distinctly showed that azobisisobutyronitrile produces inferior flocculants both at 27°C and 60°C. In addition, the results establish that the use of potassium persulfate produces more effective flocculants at 27°C than at 60°C.

EXAMPLE 2

Preparation of 52 weight percent acrylamide, 40 weight percent dimethylaminoethyl vinyl ether and 8 weight percent ethyl acrylate interpolymer as a partial acetate salt.
12.0 g. acrylamide,
90.0 g. distilled water,
40.0 g. dimethylaminoethyl vinyl ether, and
18.7 g. glacial acetic acid were introduced into a 1-liter pyrex polymerization flask which was equipped with a thermometer, condenser and dropping funnel all adapted for evacuation of air and purging with nitrogen gas. The flask was immersed in a constant temperature bath. The dropping funnel was then charged with
40.0 g. acrylamide,
200.0 g. distilled water,
4.8 g. 10% (wt.) $Na_2HPO_4$ solution, and
8.0 g. ethyl acrylate (15 PPM MEHQ* inhibitor).
* Monomethyl ether of hydroquinone The flask and funnel were evacuated to ebullition and purged with nitrogen gas for a total of three times.

0.2 g. potassium persulfate dissolved in 5 ml. of water was then added at 30°C. There was immediately noticed an exotherm which caused the temperature of the contents of the flask to rise to 40°C. After stirring for 5 minutes, 50 ml. of solution was added from the dropping funnel and external heat applied from the constant temperature bath which was regulated so as to maintain the reaction temperature at about 50°C. 0.10 g. potassium persulfate in 5 ml. of water was then added. The increment wise addition of 50 ml. of solution from the dropping funnel followed by 0.10 g. potassium persulfate and 5 ml. water periodically at about 30 minute intervals was then carried out at about 50°C for a total of five separate times. The reaction was maintained for 2 hours at a temperature of about 50°C following the final addition of catalyst. The Brookfield viscosity RVT Spindle No. 6 at 100 RPM = 4800 cps. The pH was 7.9, the solids content (sample dried high vacuum, 45°C) amounted to 27.2%.

EXAMPLE 3— The effect of pH on the Polymerization Reaction

Example 2 was repeated with the exception that additional glacial acetic acid was added to the initial charge so that the pH amounted to a value of 6. No exothermic polymerization was noted, but the polymerization temperature was maintained at 50°C. The final product had a 10% Brookfield viscosity of 69 cps. and was found not to be an effective flocculant.

EXAMPLE 4 — The effect of pH on the Polymerization Reaction

Example 2 was repeated excepting that no glacial acetic acid was added so that the pH amounted to 11.3. The polymerization reaction was exothermic. The final product had a 10% Brookfield viscosity of 124 cps. and was found to be an exceptionally effective flocculant.

EXAMPLE 5 — Effect of substitutes on the acrylamide on the polymer produced in the polymerization reaction Example 2 was repeated except that methacrylamide was substituted for acrylamide. No exothermic polymerization was observed, but the polymerization was maintained at 50°C. The final product had a Brookfield viscosity of 10% solids of 20 cps. It was found not to be an effective flocculant.

EXAMPLE 6 — The preparation of a 40 weight percent acrylamide, 50 weight percent dimethylaminoethyl vinyl ether, and 10 weight percent ethyl acrylate polymer 8.0 g. acrylamide,
10.0 g. dimethylaminoethyl vinyl ether,
2.0 g. ethyl acrylate (15 PPM MEHQ inhibitor),
0.04 g. potassium persulfate, and
80.0 g. distilled water were introduced into a Pyrex polymerization tube which was cooled to 0°C, evacuated and purged three times with nitrogen, then evacuated and sealed. The tube was then tumbled slowly at 25°C for 18 hours.

The relative viscosity (1% in water) amounted to 13.7.

EXAMPLE 7

The HCl salt of the interpolymer of Example 6 was prepared by mixing together
2.5 g. of interpolymer solution of Example 6,
47.5 g. distilled water, and
0.3 g. 37% HCl.
The pH of the solution was 2.8.

EXAMPLE 8

The acetate salt of the interpolymer of Example 6 was prepared by mixing together
2.5 g. of interpolymer solution of Example 6,
47.5 g. distilled water, and
0.72 g. glacial acetic acid.
The pH of the solution was 4.6.

EXAMPLE 9

Methyl chloride quaternary of the interpolymer of Example 6 was prepared by forming a mixture of
37.5 g. of interpolymer of Example 6 and
112.5 g. distilled water.
The mixture was introduced into an autoclave and heated to 78°C. 5.0 g. methyl chloride was then added and the mixture maintained at 78°–80°C for 6 hours. During this time, the pressure ranged from 59 lbs. PSIG to 24 lbs. PSIG. Analysis for quaternary nitrogen established that 90.5% of the amine had been converted into the quaternary compound.

EXAMPLE 10

Preparation of a 52 weight percent acrylamide, 40 weight percent dimethylaminoethyl vinyl ether and 8 weight percent ethyl acrylate interpolymer in the form of the free amine.

In an analogous procedure to that used in Example 6,
10.4 g. acrylamide,
8.0 g. dimethylaminoethyl vinyl ether,
1.6 g. ethyl acrylate,
79.0 g. distilled water, and
1.0 g. 4% aqueous potassium persulfate solution were polymerized to form a reaction product having a relative viscosity (1% in water) of 12.2 Brookfield viscosity, RVT Spindle No. 6 at 100 RPM, 10% solution equals to 2,850 cps.

EXAMPLE 11

Preparation of a 15 weight percent acrylamide, 70 weight percent dimethylaminoethyl vinyl ether and 15 weight percent ethyl acrylate interpolymer.

Using a procedure analogous to that set out in Example 6,
3.0 g. acrylamide,
14.0 g. dimethylaminoethyl vinyl ether,
3.0 g. ethyl acrylate,
80.0 g. distilled water, and
0.04 g. potassium persulfate were reacted together to form a polymer solution having a relative viscosity (1% in water) of 3.2.

The resulting material constituted an outstanding flocculant for silica.

EXAMPLE 12

Preparation of a 50 weight percent acrylamide, 30 weight percent dimethylaminoethyl vinyl ether and 20 weight percent N-vinyl-2-pyrrolidone interpolymer.

Following the procedure of Example 6,
10.0 g. acrylamide,
6.0 g. dimethylaminoethyl vinyl ether,
4.0 g. N-vinyl-2-pyrrolidone, and
1.0 g. 4% aqueous potassium persulfate solution were reacted together for 18 hours at 25°C to form a polymer solution having a relative viscosity (1% in water) of 3.2. This product was a very effective flocculant for pigment retention in a neutral sizing application.

EXAMPLE 13

Preparation of a 40 weight percent acrylamide, 50 weight percent dimethylaminoethyl vinyl ether and 10 weight percent hydroxypropyl acrylate interpolymer.

The procedure of Example 6 was followed, but
8.0 g. of acrylamide,
10.0 g. dimethylaminoethyl vinyl ether,
2.0 g. 3-hydroxypropyl acrylate,
79.0 g. distilled water, and
1.0 g. 4% aqueous potassium persulfate solution were reacted together for 18 hours at 25°C to form a polymer having a relative viscosity (1% in water) of 7.4. This product constituted a superior flocculant for pigment retention in rosin sizing.

EXAMPLE 14

Preparation of a 40 weight percent acrylamide, 40 weight percent dimethylaminoethyl vinyl ether, 10 weight percent ethyl acrylate and 10 weight percent hydroxypropyl acrylate tetrapolymer.

Using a procedure analogous to that of Example 6,
8.0 g. acrylamide,
8.0 g. dimethylaminoethyl vinyl ether, 2.0 g. ethyl acrylate,
2.0 g. 3-hydroxypropyl acrylate,
79.0 g. distilled water, and
1.0 g. 4% aqueous potassium persulfate solution were reacted for 18 hours at 25°C. The polymer that was thereby formed had a relative viscosity (1% in water) of 19.4. It was a superior flocculant for pigment retention in rosin sizing.

EXAMPLE 15

Preparation of a 30 weight percent acrylamide, 50 weight percent dimethylaminoethyl vinyl ether and 20 weight percent vinyl acetate interpolymer.

According to the procedure of Example 6,
3.0 g. acrylamide,
5.0 g. dimethylaminoethyl vinyl ether,
2.0 g. vinyl acetate,
39.5 g. distilled water, and
0.5 g. 4% aqueous potassium persulfate solution were reacted for 18 hours at 25°C. The polymer had a relative viscosity (1% in water) of 3.3. The product constituted an excellent flocculant for sewage sludge.

The following test procedures were used in evaluating the properties of the interpolymers of the invention:

A. Pigment Retention — Rosin — Sized Application in Paper

Manufacture (Single Pass Retention)

15% (on the basis of the weight of the fiber) standard air floated clay (Georgia Kaolin) was added dry to bleached sulfite (27°S.R.) at 3% consistency and the mixture thus formed mixed for 5 minutes after which 2% rosin size and 2½% alum were added. The mixing was continued for 25 minutes and pulp slurries were diluted to 0.3% consistency. The retention aid was then added from dilute aqueous solution and hand-stirred for one minute. Hand sheets were then prepared, pressed and dried in a steam-heated paper dryer using conventional methods therefor. All of the retention aids were evaluated at 8 ounces (100% basis) per ton of stock (dry basis). The retention was determined by ashing hand sheets and weighing the ashes.

B. Pigment Retention — Neutral — (Aquapel*) Side Application in Paper Manufacture (Single Pass Retention)

15% standard air floated clay (calculated on the weight of the fiber) was added dry to bleached sulfite (27°S.R.) at 3% consistency and mixed for 30 minutes. The pulp slurry was then diluted to 0.3% consistency. Aquapel Emulsion 360 (Hercules Inc.) was next added from aqueous solution, at 0.2% solids (calculated on the weight of the fiber) and hand-stirred for one minute. Hand sheets were prepared, pressed and dried in a steam-heated paper dryer. The retention was determined by ashing the hand sheets containing the retention aid as compared with controls not containing any retention aid.

* Aquapel 360X — a 6% emulsion of an alkyl ketene dimer admixed into a cationic starch protective colloid.

C. Raw Sewage Flocculation Test 1. 500 ML of raw sewage were introduced into a 1,000 ML beaker in a "gang" stirrer.
2. The sample was agitated at 80–100 RPM for from 1 to 3 minutes or until evenly suspensed.
3. 2 RPM flocculants were added to the beaker, one beaker being maintained as control (no flocculant addition).
4. The mixture was agitated at 120 RPM for 3 minutes and
5. The flocculant allowed to settle for 3 minutes.
6. The clarity of the supernatant was rated.
7. The Steps one to six above were repeated at additional 3 PPM flocculant in Step 3 (total 5 PPM).
8. The Steps 1–6 were repeated adding additional 5 PPM flocculant in Step 3 (total 10 PPM).
9. The Steps 1–6 were repeated adding additional 5 PPM flocculant in Step 3 (total 15 PPM).
10. The Steps 1–6 were repeated adding additional 5 PPM flocculant in Step 3 (total 20 PPM).

D. Silica Flocculation Test

The procedure C was repeated excepting that 0.5% of No. 19 Witaker, Clark and Daniels silica was used instead of raw sewage.

E. Sewage Sludge Conditioning (Dewatering)

A 9 cm. funnel fitted with No. 1 Whatman paper was attached to a vacuum flask and a vacuum source of 22 inches Hg. There was added to 200ml. sludge 0.4 (and 0.8) lbs. flocculant per "as is" ton sludge on a sludge basis. The mixture was gently mixed for 30 seconds. The coagulated sludge was then poured into the funnel and vacuum applied. The filtration efficiency was evaluated by recording the volume of filtrate collected in 2 minutes. The results of the above procedures have been set out in the table which follows:

| Polymer | Paper Making | | Sewage Applications | | Mining Application |
|---|---|---|---|---|---|
| | Rosin Sizing | Neutral Sizing | Raw Sewage Flocculation | Sludge Conditioning | Silica Flocculation |
| Example 2 | Slightly Inferior | Equal | Equal | Equal | Equal |
| Example 6 | 10% Superior | — | Moderately Superior | — | Superior |
| Example 8 | Superior | — | Superior | — | Superior |
| Example 9 | Superior | — | Superior | Superior | Superior |
| Example 10 | Superior | Equal | | | |
| Example 11 | | | Equal | — | Superior |
| Example 13 | Superior | Equal | Equal | — | — |
| Example 15 | — | — | Equal | — | Equal |

Standard for rosin sizing Gafloc "C 71, Natron" 86
Standard for neutral sizing, raw sewage, sludge conditioning and silica flocculation Gafloc Q-71
**National Starch product constituting an acrylamide copolymer.
* cationic polyelectrolyte polymer

We claim:

1. A member selected from the group consisting of water-soluble solid dialkylaminoethyl vinyl ether interpolymers of the formula

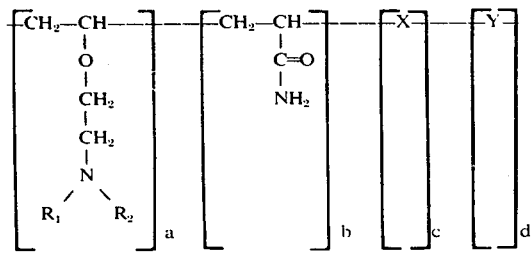

the salts thereof with inorganic and organic acids wherein $R_1$ and $R_2$ are each selected from the group consisting of methyl, ethyl and hydroxyethyl and taken together with the nitrogen atom to which they are attached a heterocyclic ring, X and Y are each vinyl monomers copolymerizable with said other monomer units in said interpolymer wherein the proportions of a, b, c and d of said monomer units in said interpolymer calculated on the basis of weight percent of the interpolymer amount to 80–10 weight percent of a, 70–10 weight percent of b, 30–0 weight percent of c, and 20–0 weight percent of d.

2. An interpolymer according to claim 1 wherein X is a member selected from the group consisting of $C_1 - C_4$ alkyl acrylates, vinyl pyrrolidone, hydroxyethylacrylate, hydroxypropylacrylate, vinyl acetate, acrylonitrile, diacetoneacrylamide, hydroxymethylacetone acrylamide and methacrylamide.

3. An interpolymer according to claim 1 constituting the interpolymer of acrylamide and dimethylaminoethyl vinyl ether.

4. An interpolymer according to claim 1 constituting the interpolymer of acrylamide, dimethylaminoethyl vinyl ether and ethyl acrylate.

5. An interpolymer constituting the hydrochloric acid salt of interpolymer of claim 4.

6. An interpolymer constituting the acetate of interpolymer of claim 4.

7. An interpolymer according to claim 1 constituting the interpolymer of 52 weight percent acrylamide, 40 weight percent dimethylaminoethyl vinyl ether and 8 weight percent ethyl acrylate.

8. An interpolymer according to claim 1 constituting the interpolymer of 15 weight percent acrylamide, 70 weight percent dimethylaminoethyl vinyl ether and 15 weight percent ethyl acrylate.

9. An interpolymer according to claim 1 constituting the interpolymer of acrylamide, dimethylaminoethyl vinyl ether and N-vinyl-2-pyrrolidone.

10. An interpolymer according to claim 1 constituting the interpolymer of acrylamide, dimethylaminoethyl vinyl ether and 3-hydroxypropyl acrylate.

11. An interpolymer according to claim 1 constituting the interpolymer of acrylamide, dimethylaminoethyl vinyl ether, ethyl acrylate, and 3-hydroxypropyl acrylate.

12. An interpolymer according to claim 1 constituting interpolymer of acrylamide, dimethylaminoethyl vinyl ether and vinyl acetate.

* * * * *